No. 742,536. PATENTED OCT. 27, 1903.
G. W. WAY.
VEHICLE FIFTH WHEEL.
APPLICATION FILED JAN. 30, 1903.

NO MODEL.

Witnesses.
Marion Richards.
Thomas L. Talbot.

Inventor.
George W. Way
by
Venice Clifford
Attorneys.

THE NORRIS PETERS CO., PHOTO-LITHO., WASHINGTON, D. C.

No. 742,536. Patented October 27, 1903.

UNITED STATES PATENT OFFICE.

GEORGE WELLS WAY, OF PORTLAND, MAINE.

VEHICLE FIFTH-WHEEL.

SPECIFICATION forming part of Letters Patent No. 742,536, dated October 27, 1903.

Application filed January 30, 1903. Serial No. 141,160. (No model.)

*To all whom it may concern:*

Be it known that I, GEORGE WELLS WAY, a citizen of the United States, residing at Portland, in the county of Cumberland and State of Maine, have invented certain new and useful Improvements in Vehicle Fifth-Wheels; and I do hereby declare the following to be a full, clear, and exact description of the invention, such as will enable others skilled in the art to which it appertains to make and use the same.

This invention relates to improvements in vehicle fifth-wheels, and is designed to produce a simple and strong fifth-wheel and one on which the carriage may be turned in a short space. It is also designed to prevent the carriage from having any tipping motion from one side to the other when persons are entering or leaving the same, to special means for keeping the king-bolt thoroughly oiled and preventing the oil or grease from coming out and disfiguring the front part of the carriage, and to provide as nearly as possible a king-bolt that will not wear and loosen, thereby preventing the disagreeable rattling which occurs under such circumstances.

To this end it consists of a cup provided with a cover attached thereto in any suitable way, said cup being attached to the front axle of the carriage or made integral therewith, as is desired, and a king-bolt with a disk-like lower extremity mounted in said cup and upon which disk the cup is enabled to be turned.

It also consists in novel means for attaching the perch, for preventing the axle from turning too far, and for preventing grit, &c., from reaching the bearing-surface of the king-bolt, and in certain other details of construction, which will be hereinafter more fully set forth and described.

Figure 1:
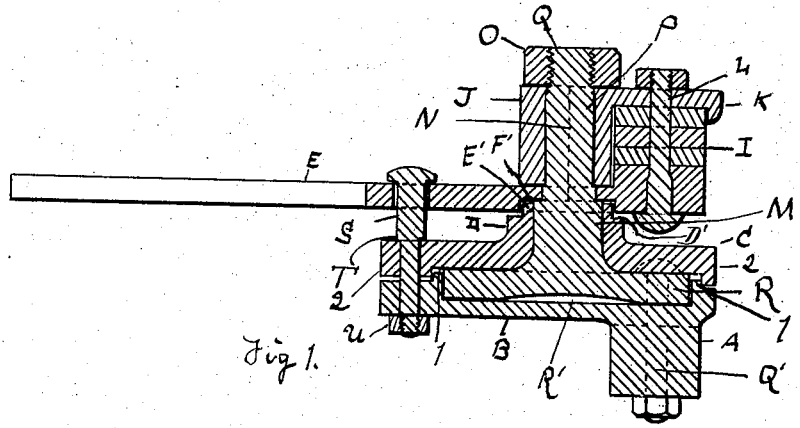
Figure 2:
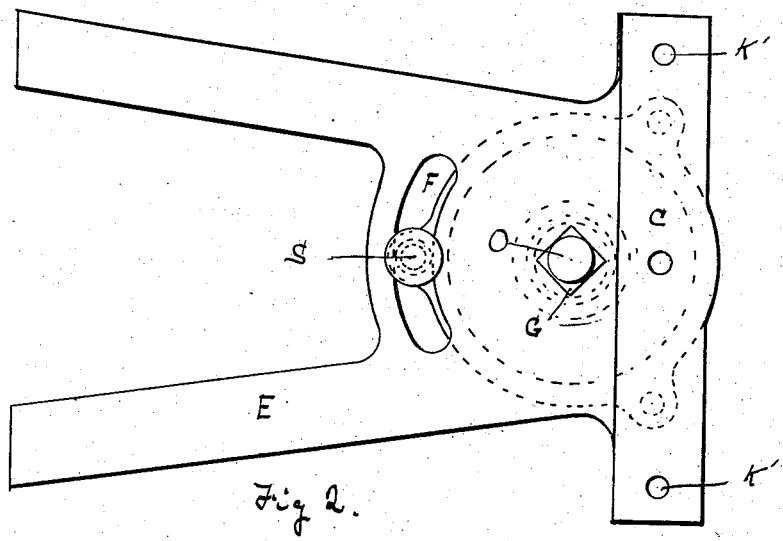

In the drawings herewith accompanying and forming a part of this application, Figure 1 is a vertical sectional view of my improved device. Fig. 2 is a top plan view of my device, showing the perch-iron and means for preventing the turning of the axle too far.

In said drawings, A represents the front axle of a carriage, which said axle is preferably made of iron or steel and in the usual form. Attached to said front axle in any suitable way, but preferably made integral therewith, is a cup B, provided with a cover C, which is provided with a raised shoulder D. Said cover is also provided with a lip D'. Mounted on said cover and slightly raised from the lip D' thereof by means of the shoulder E' on the king-bolt is the perch-iron E, said perch-iron being provided with a cutaway portion F'. This serves by fitting almost tightly over the top of the cup to prevent grit, &c., from getting in and interfering with the usual movement of the axle on the king-bolt. Said perch is also provided with a curved slot F and a rectangular opening G in the top. Mounted on the front portion of said perch-iron E and directly over the front axle of the carriage is the front spring I, held in place by a clip J, provided with a downwardly-extending flange K, which is adapted to fit over the front portion of the spring and hold the same on the perch, and running through said clip, spring, and perch-iron is a suitable bolt or other means L for holding said spring firmly in place on the perch-iron. There are also bolts K', which run through the perch-iron and front springs for the purpose of doubly insuring the holding of said springs in place on the perch-iron. Mounted in said cup B is a king-bolt N, said king-bolt extending up through an opening M in the cover C, through the opening in the perch-iron, and from thence through the clip J, where it is firmly held in position by means of a nut O. Said king-bolt is provided with a rectangular shank P, extending from the top of the cover C of the cup to the threaded end Q, on which the nut O is placed. The king-bolt N on its lower end is provided with an enlarged disk-like bearing R, the diameter of which approximately equals the inner diameter of the cup B. The lower side of said disk R is hollowed out, as seen at R', so as to allow a sufficient amount of lubricant being placed in the cup and beneath said disk-like bearing, so as to lessen the amount of friction when the front axle of the carriage and its cup is turned thereon. The cover C of the cup B is rigidly held in place thereon by means of bolts Q', the purpose of this being to keep the king-bolt M in position and to prevent the same from being displaced and also to prevent the lubricant from coming out of the cup. Extending from the slot F in the perch-iron is also a headed bolt S, having a shoulder T thereon and a nut U on the lower end thereof for holding said bolt in position, that portion of the bolt below the shoulder serving as one of the means for holding the cover on the cup. The object in providing the bolt with a shoulder is to allow the nut on the lower end to be set up very tightly, so as to hold the cover on the cup and at the same time to allow movement of the bolt S in the slot F in the perch-iron when the axle of the carriage is turned.

It will be evident from the description herewith that the king-bolt must remain rigid and that when the axle is turned the axle and its cup move on the king-bolt, the enlarged lower end on the king-bolt serving as the pivot on which the axle and cup turn. The enlarged lower end also serves as a means for sustaining the weight of the carriage and also prevents the same from tipping from one side to the other when persons enter or leave the carriage. When the carriage is set up and before the cover on the cup is put in place, the cup is filled with grease or other lubricant and the cover put on. From this it will be seen that friction can be reduced to a minimum and that owing to the arrangement of the cover and the perch the disintegrated lubricant or grease will not leak out, and consequently will not disfigure the carriage, as is common in fifth-wheels now in use. The bolt S, running from the curved slot in the perch-iron and from thence through the extension below on the cup B, serves further as an additional means for holding the carriage on the front axle, and, as before mentioned, limits the distance that the wheels can turn, and it further serves, as has been proved by experience, in case the king-bolt breaks as a safety device in preventing the carriage-body from leaving the front axle. In order to further prevent the leaking out of the lubricant between the edges of the cup and its cover, I provide said cup with an upwardly-extending flange 1 and said cover with a downwardly-extending flange 2, said downwardly-extending flange being adapted to fit over the upwardly-extending flange on the cup, thereby making a tight joint.

It is evident from the construction of the king-bolt and its disk the king-bolt, as it does, extending up through the perch-iron and clip and carrying a nut on its upper end, that if any wear should come upon the cup or the disk-like lower end of the king-bolt the same can be taken up by tightening the nut O on the top of the king-bolt.

I do not wish to limit myself to the exact construction as shown herein in the drawings and described in the specification, for the same may be varied without departing from the spirit of my invention.

Having thus described my invention and its use, I claim—

In a vehicle fifth-wheel, an axle with an enlargement at or near the center thereof and on the upper side, forming a cup integral with said axle, a removable cover for said cup provided with a downwardly-extending flange adapted to fit over said cup, a perch-iron, a king-bolt with an enlarged disk-like lower end resting in said cup, the shank of said king-bolt extending upwardly through an opening in the cover and a socket in the perch-iron, the under side of said socket being cut away so as to fit down over the cover and rest upon a shoulder on said king-bolt which extends upwardly above said cover, the shank of said king-bolt above the perch-iron being substantially rectangular, a segmental slot in said perch-iron, a shouldered bolt extending through the slot in the perch-iron and cover serving as one of the means for holding the cover down on said cup and also for limiting the turning of the axle, and means for holding said cover firmly upon said cup.

In testimony whereof I have affixed my signature, in presence of two witnesses, this 14th day of January, 1903.

GEORGE WELLS WAY.

In presence of—
NATHAN CLIFFORD,
F. O. BAILEY.